(No Model.)
J. T. HAWKINS.
DETACHABLE GRIPPER FOR PRINTING MACHINES.
No. 359,864. Patented Mar. 22, 1887.
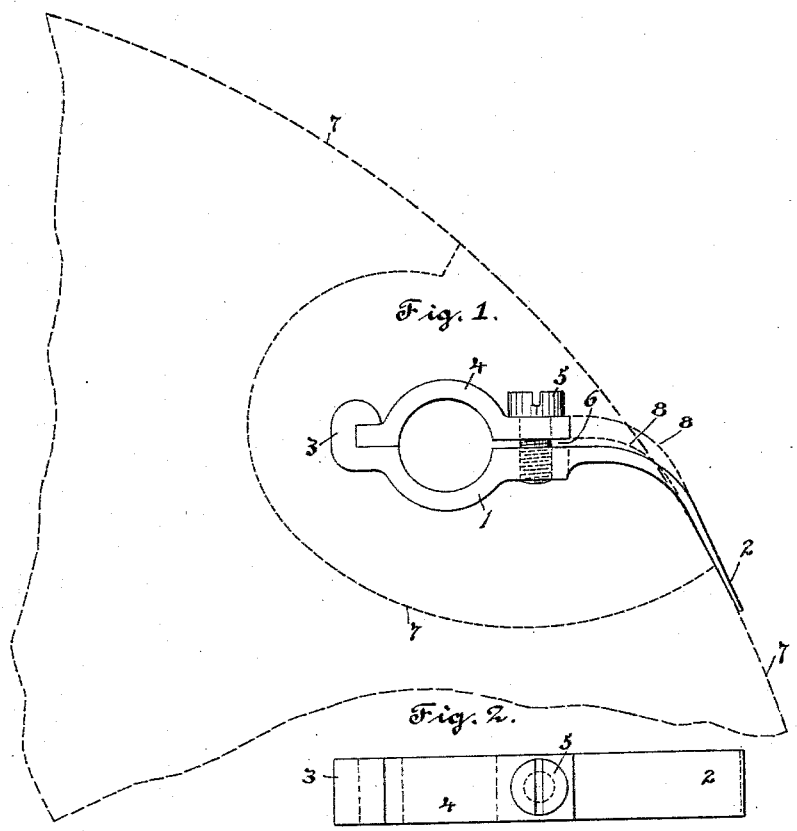

UNITED STATES PATENT OFFICE.

JOHN T. HAWKINS, OF TAUNTON, MASSACHUSETTS.

DETACHABLE GRIPPER FOR PRINTING-MACHINES.

SPECIFICATION forming part of Letters Patent No. 359,864, dated March 22, 1887.

Application filed January 7, 1887. Serial No. 223,693. (No model.)

*To all whom it may concern:*

Be it known that I, JOHN T. HAWKINS, of Taunton, in the county of Bristol and State of Massachusetts, have invented a new and useful Detachable Gripper for Printing-Machines, which invention is fully set forth and illustrated in the following specification and accompanying drawings.

The object of this invention is to provide a gripper which may be readily detachable from its shaft without the necessity for removing the said shaft from its bearings, to avoid the use of set-screws impinging upon, and thereby marring said shaft, and to have the clamping-screw in such position as to be most readily accessible through the usual gaps in printing-press cylinders, within which the gripper-shaft oscillates.

The invention will first be described, and then particularly set forth in the claim.

In the accompanying drawings, Figure 1 is a side elevation, and Fig. 2 a plan, illustrating the grippers forming the subject of this invention.

In said figures the gripper is shown in two pieces, one of which, 1, is extended into a tongue or point, 2, its other end being formed into a grooved hook, 3. The other part of the gripper constitutes a cap, 4, one end of which fits like a tenon or tongue into the groove 3, its other end having a hole bored for the reception of the screw 5, which screw is threaded and enters a hole correspondingly tapped out to receive it in the part 1. A space, 6, is left between the two parts 1 and 4 on that side of the shaft at which the screw 5 acts to clamp the gripper on the shaft. By said action of the screw 5 the two parts of the gripper are drawn together, as in the well-known split solid socket. The dotted lines 7 show one form of gap of a printing-press cylinder, within which the gripper-shaft 9 oscillates, and said lines illustrate how the position in the gripper given to the clamping-screw 5 is rendered more accessible for manipulation than if placed on the opposite side of the gripper-shaft.

It is obvious that the tongue 2 may be made a part of the cap 4 instead of a part of the lower part 1, as shown in dotted lines 8, without departing from the gist of this invention, and in some cases it may be found desirable to do so.

I am aware that detachable grippers have heretofore been suggested, as shown in Patent No. 274,546, of March 27, 1883, and also others, in which a set-screw impinges upon the shaft and in which the clamping action of the well-known split solid socket is not had. As such constructions mar the shaft in the same way as the ordinary solid gripper does, by means of a set-screw impinging upon and thereby biting into or otherwise marring the shaft it will be seen that one great object of this invention is secured by its providing as effective a clamping action as that of the well-known non-detachable split solid socket, while at the same time securing facile detachability.

Having thus fully described my said improved construction as of my invention, I claim—

A detachable gripper consisting of two parts, as 1 and 4, upon one of which the tongue or point of the gripper is formed, engaging each other at one side of the shaft by a groove-and-tenon joint, and adjusted to clamp the shaft by means of a space left between them, as at 6, and a screw, as 5, at the opposite side of said shaft, whereby said parts are drawn together on one side, and said gripper is securely clamped on the shaft by a clamping-screw without marring the same by a set-screw point, and is readily detached from said shaft, while the clamping-screw is most accessibly placed for adjustment or removal, substantially as and for the purposes set forth.

JOHN T. HAWKINS.

Witnesses:
ELISHA T. JACKSON,
ALBERT J. PARK.